(12) United States Patent
Lee et al.

(10) Patent No.: US 8,661,543 B2
(45) Date of Patent: Feb. 25, 2014

(54) MOBILE TERMINAL HAVING SECURITY DIAGNOSIS FUNCTIONALITY AND METHOD OF MAKING DIAGNOSIS ON SECURITY OF MOBILE TERMINAL

(75) Inventors: Jung-Hee Lee, Daejeon (KR); Sang-Wook Lee, Daejeon (KR); Jong-Moon Lee, Daejeon (KR); Byung-Chul Bae, Daejeon (KR); Sang-Woo Park, Daejeon (KR); E-Joong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/488,772

(22) Filed: Jun. 5, 2012

(65) Prior Publication Data

US 2013/0219498 A1 Aug. 22, 2013

(30) Foreign Application Priority Data

Feb. 16, 2012 (KR) ........................ 10-2012-0015844

(51) Int. Cl.
*G06F 12/14* (2006.01)
*G06F 11/00* (2006.01)
*G06F 12/16* (2006.01)

(52) U.S. Cl.
USPC .................. 726/23; 726/22; 726/24; 726/25; 726/26

(58) Field of Classification Search
None
See application file for complete search history.

(56) References Cited

U.S. PATENT DOCUMENTS

| 8,387,141 | B1* | 2/2013 | Zhukov et al. | 726/22 |
| 2011/0047620 | A1* | 2/2011 | Mahaffey et al. | 726/23 |
| 2013/0031595 | A1* | 1/2013 | Nevstruev et al. | 726/1 |
| 2013/0097660 | A1* | 4/2013 | Das et al. | 726/1 |

FOREIGN PATENT DOCUMENTS

| KR | 10-2008-0074271 A | 8/2008 |
| KR | 10-2009-0015594 A | 2/2009 |
| KR | 10-2011-0128632 A | 11/2011 |

OTHER PUBLICATIONS

Bryan Dixon et al., "On Rootkit and Malware Detection in Smartphones," International Conference on Dependable Systems and Networks Workshops, 2010, pp. 162-163.
Thomas Bläsing et al., "An Android Application Sandbox System for Suspicious Software Detection," International Conference on Malicious and Unwanted Software, 2010, pp. 55-62.

* cited by examiner

*Primary Examiner* — Cordelia Zecher
*Assistant Examiner* — Trang Doan
(74) *Attorney, Agent, or Firm* — LRK Patent Law Firm

(57) ABSTRACT

A mobile terminal having security diagnosis functionality and a method of making a diagnosis on the security of the mobile terminal are provided. The mobile terminal includes a system check unit, an interface unit, a blacklist check unit, and a security diagnosis unit. The system check unit collects the basic information of the mobile terminal by performing a system check on the mobile terminal. The interface unit provides the basic information of the mobile terminal to a user and receives a control command from the user. The blacklist check unit checks whether at least one application installed in the mobile terminal is present in a blacklist registered on a server. The security diagnosis unit checks whether an abnormality has occurred in the corresponding application based on results of the comparison between the basic information of the mobile terminal with preset abnormality detection reference information and the control command.

16 Claims, 5 Drawing Sheets

MOBILE TERMINAL HAVING SECURITY DIAGNOSIS FUNCTIONALITY AND METHOD OF MAKING DIAGNOSIS ON SECURITY OF MOBILE TERMINAL

CROSS REFERENCE TO RELATED APPLICATION

This application claims the benefit of Korean Patent Application No. 10-2012-0015844, filed on Feb. 16, 2012, which is hereby incorporated by reference in its entirety into this application.

BACKGROUND OF THE INVENTION

1. Technical Field

The present invention relates generally to a mobile terminal having security diagnosis functionality and a method of making a diagnosis on the security of the mobile terminal and, more particularly, to a mobile terminal having security diagnosis functionality and a method of making a diagnosis on the security of the mobile terminal, which enable abnormalities attributable to unknown malware to be detected early on in a mobile terminal.

2. Description of the Related Art

In general, a variety of mobile anti-viruses capable of detecting malware are used to make diagnoses on the security of mobile terminals. Such mobile anti-viruses detect malware using corresponding malicious patterns that are obtained by the analysis of the malware by anti-virus solution companies.

In addition to the pattern-based malware detection method, malware detection methods using behavioral analysis are being proposed. Most of the methods use a method of moving the data of a mobile terminal to a Personal Computer (PC) or a desktop computer and then detecting abnormal behavior.

A method of installing a virtual environment in a PC and analyzing behavior provides a powerful analysis method, but is disadvantageous in that behavioral analysis is difficult for the user of a mobile terminal to carry out. A method of synchronizing a mobile terminal with a PC and detecting the abnormality of the mobile terminal using the PC is problematic in that it is difficult to detect malware before a connection to the PC is established.

Meanwhile, Korean Patent No. 0878895 discloses a configuration that detects malware via the cooperation between a malware processing system installed in a mobile terminal and a separate central processing center managed via a base station. Here, the malware processing system installed in the mobile terminal continuously monitors digital data input to the mobile terminal, like a typical anti-virus, and identifies malware on a signature basis.

In the configuration, the malware processing system is configured to connect with a server in real time and monitor all values input to a mobile terminal in real time. Accordingly, the configuration is disadvantageous in that overhead may occur on the mobile terminal and it is impossible to detect malware when the connection with the server is released.

SUMMARY OF THE INVENTION

Accordingly, the present invention has been made keeping in mind the above problems occurring in the prior art, and an object of the present invention is to provide a mobile terminal having security diagnosis functionality and a method of making a diagnosis on the security of the mobile terminal, which enable a mobile terminal to detect an abnormality related to unknown malware without causing overhead.

In particular, the present invention provides a mobile terminal having security diagnosis functionality and a method of making a diagnosis on the security of the mobile terminal, which even when a mobile terminal does not have malware information, enable an abnormality to be detected using the collection of basic information based on a system check.

Another object of the present invention is to provide a mobile terminal having security diagnosis functionality and a method of making a diagnosis on the security of the mobile terminal, which are capable of diagnosing whether an application having an abnormality is malicious, in conjunction with a server.

In order to accomplish the above objects, the present invention provides a mobile terminal having security diagnosis functionality, including a system check unit for collecting basic information of the mobile terminal by performing a system check on the mobile terminal; an interface unit for providing the basic information of the mobile terminal, collected as a result of the system check performed by the system check unit, to a user and receiving a control command from the user, a blacklist check unit for checking whether at least one application installed in the corresponding mobile terminal is present in a blacklist registered on a server, and a security diagnosis unit for, with regard to the application has not been detected as a malicious application by the blacklist check unit, checking whether an abnormality has occurred in the corresponding application based on results of a comparison between the basic information of the mobile terminal collected by the system check unit with preset abnormality detection reference information and the control command from the interface unit.

The system check unit may collect at least one piece of basic information selected from among system information of the corresponding mobile terminal, a list of applications installed, a list of applications being run, numbers of SMS transmissions and calls, application downloading history, accessed Uniform Resource Locator (URL) information, a shell execution history, a communication access history and principal file attributes.

The security diagnosis unit may suspect that an abnormality has occurred in an application installed or being run on the corresponding mobile terminal if it is determined that the application is not an application installed by the user based on the user's control command.

The security diagnosis unit may suspect that an abnormality has occurred in an application installed or being run in the corresponding mobile terminal if it is determined based on the at least one piece of basic information that a program which downloaded the application is a program having a history of downloading a malicious application.

The security diagnosis unit may suspect that an abnormality has occurred in an application if the at least one piece of basic information exceeds a reference value.

The security diagnosis unit may request the server to determined whether an application, that is suspected that an abnormality has occurred in the application, is malignant based on results of checking whether an abnormality has occurred with the approval of the user, and determine that the corresponding application is malicious based on results of a response from the server.

The security diagnosis unit may remove the corresponding application for which it is suspected that the abnormality has occurred if the application is diagnosed as a malicious application by the server.

The blacklist check unit may remove the application present in the blacklist registered on the server among the at least one application installed in the mobile terminal.

In order to accomplish the above objects, the present invention provides a method of making a diagnosis of security of a mobile terminal, including checking whether at least one application installed in the mobile terminal is present in a blacklist registered on a server; collecting basic information of the mobile terminal by performing a system check on the mobile terminal; providing the basic information of the mobile terminal, collected as a result of the system check, to a user and receiving a control command from the user, comparing at least one piece of basic information with preset abnormality detection reference information based on the collected basic information with regard to the application that does not exist on the blacklist; and checking whether an abnormality has occurred in the mobile terminal based on results of the comparison and the control command inputted by the user.

The collecting may include collecting at least one piece of basic information selected among system information of the corresponding mobile terminal, a list of applications installed, a list of applications being run, numbers of SMS transmissions and calls, application downloading history, accessed URL information, a shell execution history, a communication access history and principal file attributes.

The checking may include suspecting that an abnormality has occurred in an application installed or being run on the corresponding mobile terminal if it is determined that the application is not an application installed by the user based on the user's control command.

The comparing may include checking whether a program which downloaded the corresponding application is a program having a history of downloading a malicious application.

The comparing may include checking whether the at least one piece of basic information exceeds a reference value.

The method may further include requesting the server to determined whether an application, that is suspected that an abnormality has occurred in the application, is malignant based on results of checking whether an abnormality has occurred with the approval of the user, and determining that the corresponding application is malicious based on results of a response front the server.

The method may further include removing the corresponding application for which it is suspected that the abnormality has occurred if the application is diagnosed as a malicious application by the server.

The method may further include removing the application present in the blacklist registered on the server among the at least one application installed in the mobile terminal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
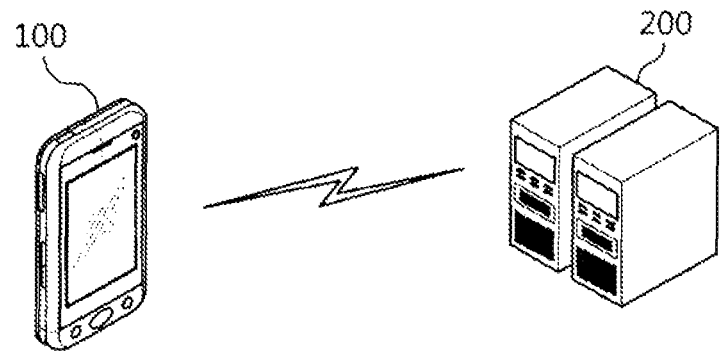
FIG. 1 is a diagram illustrating the configuration of a system to which a mobile terminal according to the present invention is applied.

Reference now should be made to the drawings, throughout which the same reference numerals are used to designate the same or similar components.

Embodiments of the present invention will be described with reference to the accompanying drawings below. Although malware will be described as an app or application in the following description so as to clarify the embodiments of the present invention, malware may be configured in code form, like a shell.

FIG. 1 is a diagram illustrating the configuration of a system to which a mobile terminal 100 according to the present invention is applied.

The mobile terminal 100 according to the present invention, even when it does not have malware information, collects basic information by performing a system check on the mobile terminal 100, and detects an abnormality related to unknown malware based on the results of the comparison between the collected basic information and preset abnormality detection reference information, the collected basic information, and an input control command.

The mobile terminal 100 reports an application having an abnormality in conjunction with a server 200, and the server 200 diagnoses whether the application having an abnormality is malicious in response to a request from the mobile terminal 100.

Furthermore, the server 200 registers and manages a blacklist in a database, compares the application having an abnormality with the entries in the blacklist registered in the database in response to a request from the mobile terminal 100, and notifies the mobile terminal 100 of the results of the comparison.

Accordingly, the mobile terminal 100 primarily checks on an application having an abnormality, and may diagnose whether the corresponding application is malicious by requesting the conjunct server 200 to check on the application when it is difficult to diagnose whether the application having an abnormality is malicious.

Furthermore, the server 200 not only diagnoses whether an application having an abnormality is malicious, but may also provide a batch file to be used to perform a system test on the mobile terminal 100 and its update file.

Detailed descriptions of the configurations of the mobile terminal 100 and the server 200 will now be given with reference to FIGS. 2 and 3.

Figure 2:
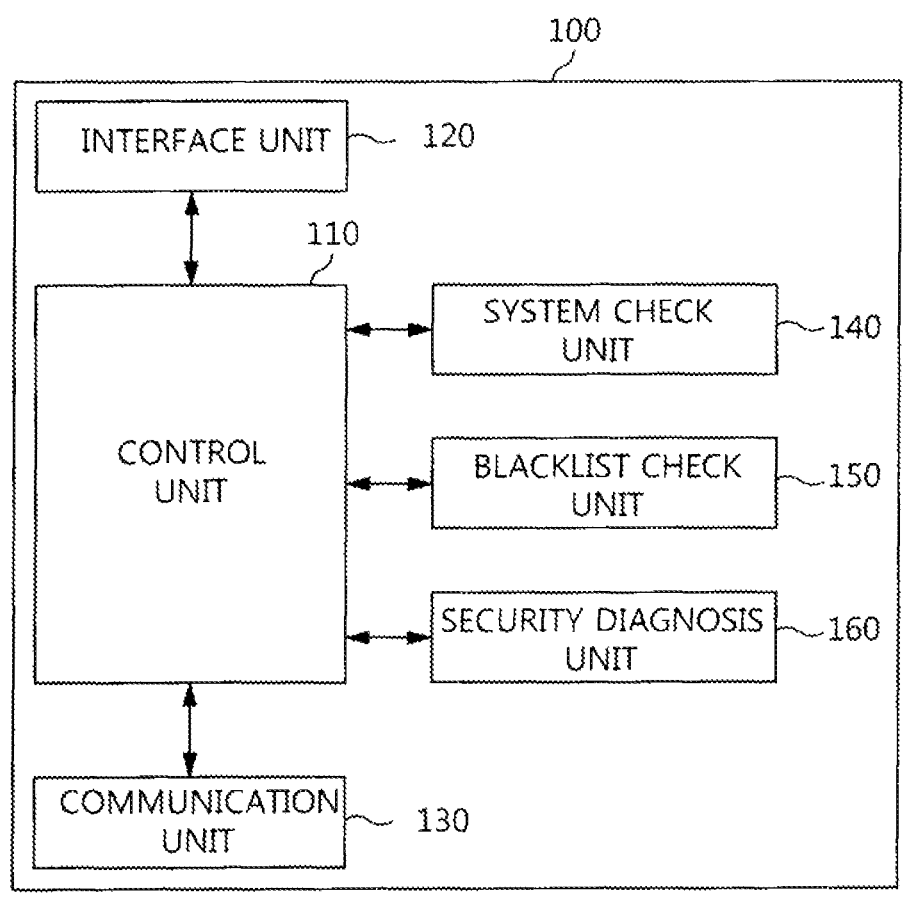
FIG. 2 is a block diagram illustrating the configuration of the mobile terminal according to the present invention.

FIG. 2 is a block diagram illustrating the configuration of the mobile terminal according to the present invention.

As shown in FIG. 2, the mobile terminal 100 according to the present invention includes a control unit 110, an interface unit 120, a communication unit 130, a system check unit 140, a blacklist check unit 150, and a security diagnosis unit 160.

Here, the control unit 110 controls the operation of the components of the mobile terminal 100.

The interface unit 120 may include input means for receiving control commands from a user, and output means for outputting the operating status of the mobile terminal 100, processing results, etc. Here, the input means and the output means may be provided in the form of separate units, and may be implemented as a single unit, such as a touch screen.

The communication unit 130 supports communication interfacing to perform communication with the server 200.

The system check unit 140 collects the basic information of the mobile terminal 100 by performing a system check on the mobile terminal 100.

At this time, the system check unit 140 collects at least one piece of basic information selected from among the system information of the mobile terminal 100, a list of applications installed, a list of application being run, the numbers of SMS and call transmissions, application download records, accessed Uniform Resource Locators (URLs), shell execution records, communication access records, and principal file attributes. It will be apparent that this is only an embodiment and the system check unit 140 may additionally collect other types of information.

The at least one piece of basic information collected by the system check unit 140 is provided to the user via the interface unit 120. In this case, the interface unit 120 may receive a control command from the user based on the output basic information. Here, the control command received from the user may be used to diagnose an abnormality of a specific application.

Furthermore, the at least one piece of information collected by the system check unit 140 is used by the security diagnosis unit 160 to diagnose an abnormality.

The system check unit 140 makes a system check via a batch file installed in the mobile terminal 100. The system check may be made by the mobile terminal 100 independently without connecting with the server 200.

Here, the batch file which is run when the system check unit 140 makes a system check may be downloaded from the server 200 and updated from the server 200.

The blacklist check unit 150 checks whether applications registered in the blacklist were installed in the mobile terminal 100. Before the system check unit 140 makes a system check, the blacklist check unit 150 checks whether an application registered in the blacklist was installed. It will be apparent that in an embodiment, a system check may be made first and then it may be checked whether applications registered in the blacklist were installed.

At this time, in light of the facts that the capacity of the memory of the mobile terminal 100 is limited and that information can be easily shared with other mobile terminals, the blacklist check unit 150 requests the server 200 to check whether applications installed in the mobile terminal 100 were registered in the blacklist.

In greater detail, the blacklist check unit 150 creates a list of applications installed in the mobile terminal 100, sends the list to the server 200, and receives the results of the comparison between the list of applications and the previously registered blacklist from the server.

The blacklist check unit 150 checks whether the applications installed in the mobile terminal 100 are malware registered in the blacklist based on the results of the comparison with the blacklist received from the server 200.

It will be apparent that the blacklist check unit 150 may receive the results of the comparison in the form of small-sized values, such as file names and hash values, in order to reduce the amount of data to be transmitted between the mobile terminal 100 and the server 200.

If an application is diagnosed as malware previously registered in the blacklist, the blacklist check unit 150 may remove the malicious application diagnosed as malware from the mobile terminal 100. This allows the blacklist check unit 150 to primarily diagnose whether the applications installed in the mobile terminal 100 are malware.

The security diagnosis unit 160 secondarily diagnoses whether an abnormality has occurred in the mobile terminal 100 based on information collected by the system check unit 140 if the blacklist check unit 150 has not found malware based on the information collected by the system check unit 140.

First, the security diagnosis unit 160 diagnoses whether an abnormality has occurred in the mobile terminal 100 based on at least one piece of basic information collected as a result of a system check in compliance with a control command input by the user via the interface unit 120.

By way of an example, the security diagnosis unit 160 may determine that an abnormality has occurred in a corresponding application if it is determined that the application installed in the mobile terminal 100 or being run is an application installed by the user based on a control command input by the user.

Meanwhile, the security diagnosis unit 160 diagnoses whether an abnormality has occurred in the mobile terminal 100 by comparing the collected at least one piece of basic information with preset abnormality detection reference information.

By way of an example, the security diagnosis unit 160 determines that an abnormality has occurred if an excessive signal transmission symptom is detected, in which the number of calls or the number of SMS transmissions that belongs to the information collected by the system check unit 140 exceeds a reference value. In this case, the security diagnosis unit 160 may suspect the abnormality to be caused by the infection of attributable to an excessive signal transmission symptom.

Furthermore, security diagnosis unit 160 may determine that an abnormality has occurred in a corresponding application if it is determined based on at least one piece of basic information that a program that downloaded an application installed or being run has a history of downloading a malicious application.

It will be apparent that the above-described example is merely an embodiment and that the occurrence of an abnormality may be determined using system information, accessed URL information, a shell execution history, a communication access history, and/or principal file attributes.

In this case, the interface unit 120 outputs the results of the determination of the occurrence of the abnormality, so that the user can be notified of them.

If the user cannot diagnose whether the application for which it is determined by the security diagnosis unit 160 that an abnormality has occurred is malicious, the security diagnosis unit 160 may request the server 200 to diagnose whether the application is malicious with the approval of the user by sending information about the application having an abnormality and the results of the system check to the server 200.

At this time, the security diagnosis unit 160 may send a file to the server 200 in compressed form in order to reduce the amount of data to be transmitted.

Meanwhile, the security diagnosis unit 160 receives the results of the diagnosis of whether the corresponding application is malicious from the server 200, and may remove the corresponding application from the mobile terminal 100 if it is determined based on the received results that the corresponding application is malicious.

In this case, the server 200 registers the malicious application in the blacklist.

Figure 3:
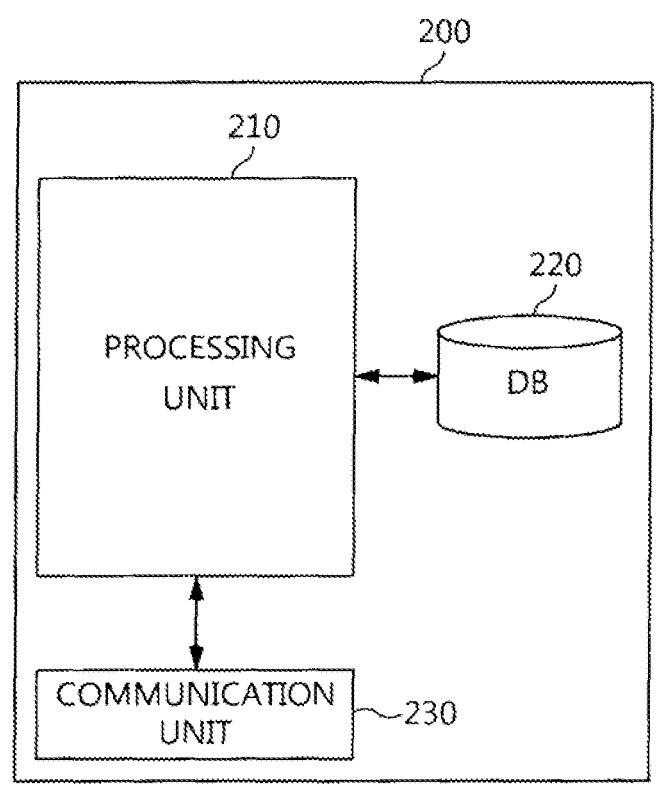
FIG. 3 is a block diagram illustrating the configuration of a server that operates in conjunction with the mobile terminal so as to make a diagnosis of the security of the mobile terminal according to the present invention.

FIG. 3 is a block diagram illustrating the configuration of the server 200 that operates in conjunction with the mobile terminal 100 so as to make a diagnosis of the security of the mobile terminal 100 according to the present invention.

As shown in FIG. 3, the server 200 according to the present invention includes a processing unit 210, a database (hereinafter referred to as the "DB") 220, and a communication unit 230.

Here, the processing unit 210 controls the operation of the components of the server 200.

The DB 220 stores a blacklist of applications which have been diagnosed as malware.

Here, the information of a DB published by an anti-virus solution company may be utilized as information about malware registered in the blacklist. Furthermore, the DB 220 may additionally store, in the blacklist, information about malicious applications which have been diagnosed by the server 200 as malware as a result of the diagnosis of the applications having an abnormality.

Furthermore, the DB 220 may store a variety of information about malware such as information about the developers of applications diagnosed as malware and signature values. Furthermore, the DB 220 may store the file names and hash values of applications registered in the blacklist.

The communication unit 230 supports communication interfacing to perform communication with the mobile terminal 100.

Here, the communication unit 230 receives a request for determining whether a specific application has been registered in the blacklist or a request for the registration of a specific application in the blacklist from the mobile terminal 100.

Furthermore, the communication unit 230 receives a request for determining the occurrence of an abnormality from the mobile terminal 100, and sends the results of the determination of the occurrence of the abnormality to the mobile terminal 100.

Meanwhile, the processing unit 210 compares the list of applications installed in the mobile terminal 100 with the blacklist registered in the DB 220 when a request for a diagnosis of whether applications installed in the mobile terminal 200 are malicious is received from the mobile terminal 100.

In this case, the processing unit 210 may perform comparison with the blacklist using the file names and hash values of the applications in order to reduce the amount of data to be transmitted between the mobile terminal 100 and the server 200.

The processing unit 210 sends the results of the comparison with the blacklist to the mobile terminal 100, and the mobile terminal primarily diagnoses whether the corresponding application is malicious based on the results of the comparison with the blacklist.

Furthermore, the processing unit 210 may diagnose whether the corresponding application is malicious based on the abnormality of the corresponding application in response to a request from the mobile terminal 100 if the abnormality of the application which was not registered in the blacklist is detected by the mobile terminal 100.

In this case, the processing unit 210 diagnoses whether the application is malicious in response to the request from the mobile terminal 100 based on a variety of information about malware such as information about the developer of the application and a signature value. Furthermore, the processing unit 210 may assign a weight to a malware diagnosis factor, such as a developer who has a history of distributing a malicious application, and then calculate the possibility of malware.

The processing unit 210 sends the results of the diagnosis of whether the application having the abnormality is malicious to the mobile terminal 100. Accordingly, the mobile terminal becomes aware that the corresponding application is malicious based on the results of the diagnosis received from the server 200.

Meanwhile, the processing unit 210 adds the corresponding application to the blacklist of the DB 220 if the application having the abnormality is diagnosed as a new malicious application.

Figure 4:
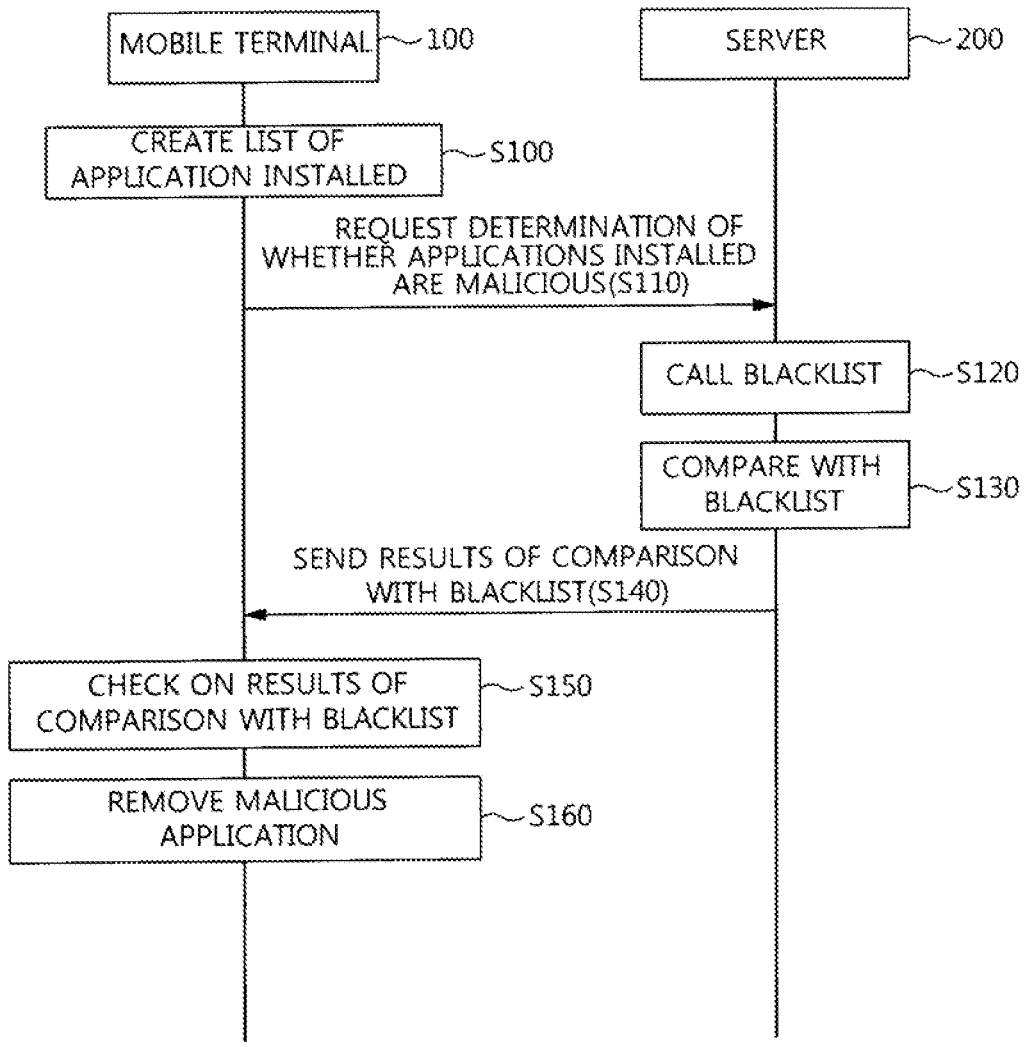
FIGS. 4 to 6 are flow diagrams illustrating the flows of the processes of a method of making a diagnosis on the security of the mobile terminal according to the present invention.
Figure 5:
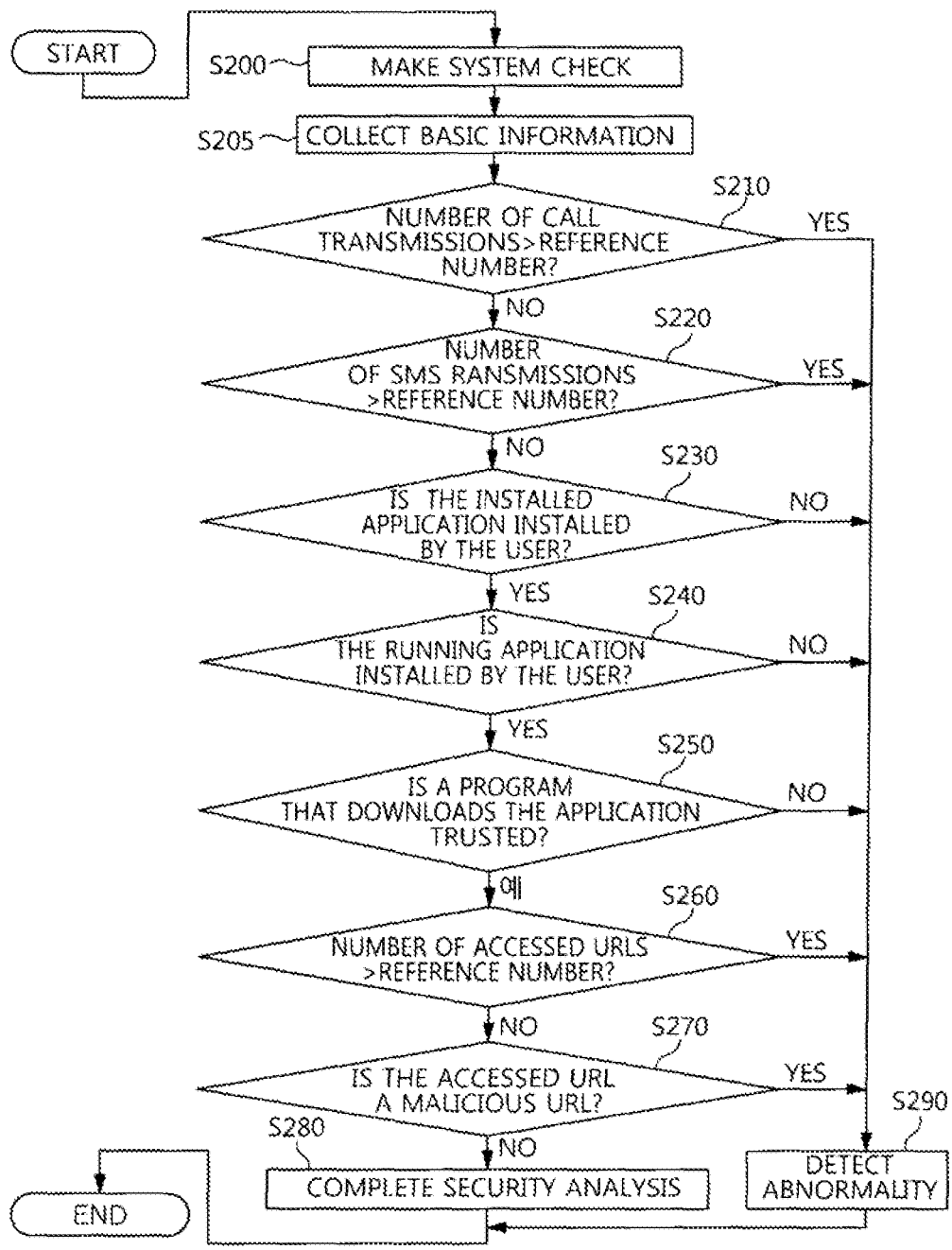
Figure 6:
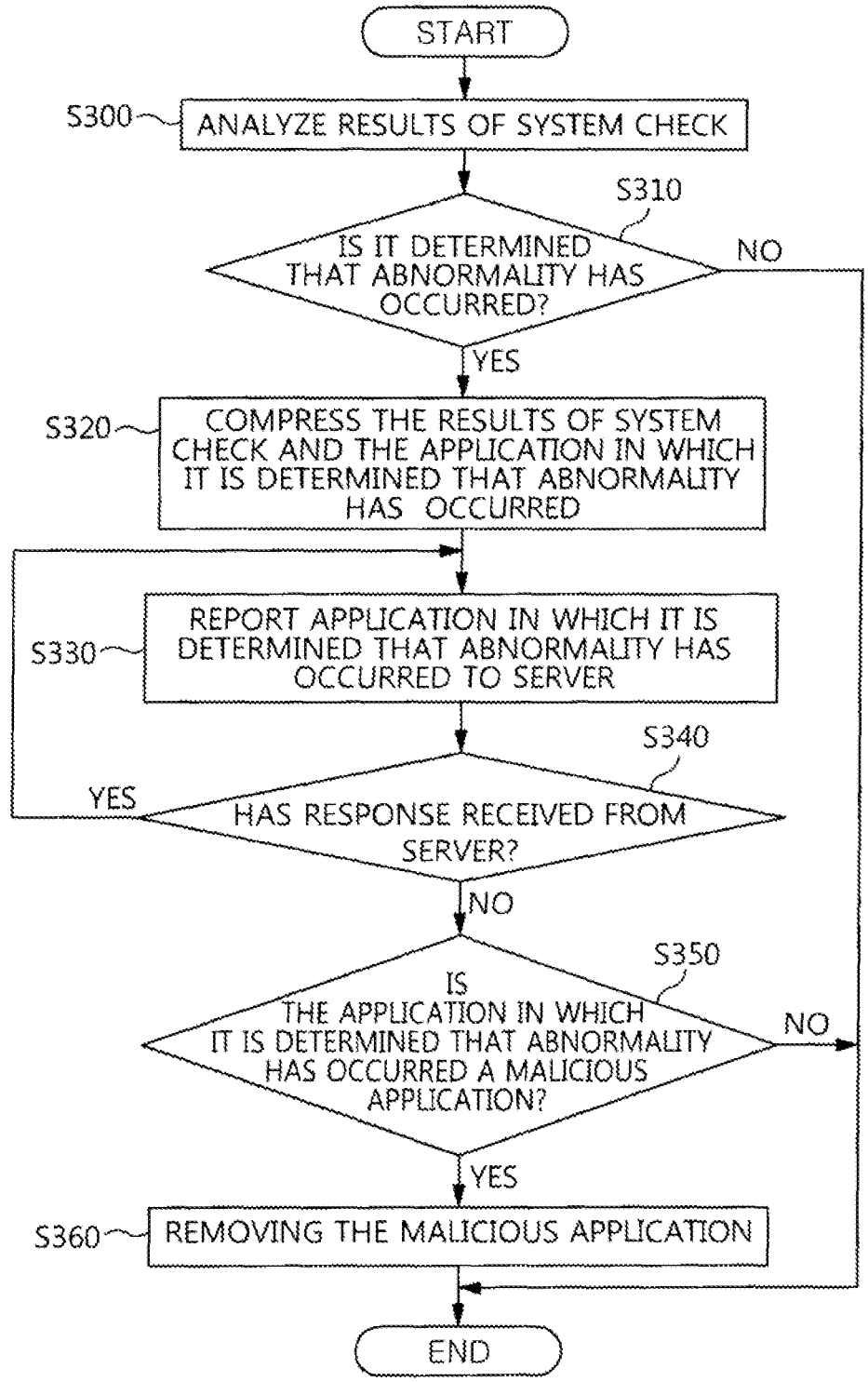

FIGS. 4 to 6 are flow diagrams illustrating the flows of the processes of a method of making a diagnosis on the security of the mobile terminal according to the present invention.

First, FIG. 4 illustrates the flow of the process of diagnosing whether an application is malicious using the comparison with the blacklist.

As shown in FIG. 4, the mobile terminal 100 creates a list of applications installed in the mobile terminal 100 at step S100, and requests the server 200 to diagnose whether the installed applications are malicious while sending the list of applications created at step S100 to the server 200 at S110.

The server 200 calls the blacklist, registered in the DB, so as to diagnose whether the applications of the list sent at step S110 are malicious in response to a request from the mobile terminal 100 at step S120.

At step S130, the server 200 compares the list of applications received at step S110 with the blacklist called at step S120. The server 200 may perform the comparison with the blacklist using the file names and hash values of the applications in order to reduce the amount of data to be transmitted between the mobile terminal 100 and the saver 200 at step S130.

Thereafter, the server 200 sends the results of the comparison with the blacklist, obtained at step S130, to the mobile terminal 100 at step S140.

Meanwhile, at step S150, the mobile terminal 100 checks on the results of the comparison with the blacklist received from the server 200 at step S140, thereby checking whether a malicious application registered in the blacklist is present in the list of applications installed in the mobile terminal 100.

If a malicious application registered in the blacklist is present among the applications installed in the mobile terminal 100, the mobile terminal 100 removes the corresponding malicious application from the mobile terminal 100 at step S160. In this case, the mobile terminal 100 may gain the user's approval before removing the corresponding malicious application and remove the corresponding malicious application with the approval of the user.

FIG. 5 is a flow diagram illustrating the flow of a process in which the mobile terminal 100 detects an abnormality according to the present invention.

As shown in FIG. 5, the mobile terminal 100 according to the present invention makes a system check by executing a batch file installed in the mobile terminal 100 at step S200, and collects the basic information of the mobile terminal 100 as a result of the system check at step S205.

The basic information of the mobile terminal collected at step S205 includes at least one piece of information about the system of the mobile terminal 100, a list of applications installed, a list of applications being run, the numbers of SMS transmissions and calls, records of downloads of applications, accessed URL information, a shell execution history, a communication access history, and principal file attributes. It will be apparent that this is merely an embodiment and it may be possible to collect other information.

Thereafter, the mobile terminal detects an abnormality by comparing the at least one piece of basic information collected at step S205 with the abnormality detection reference information, or detects an abnormality based on a control command input by the user.

By way of example, the mobile terminal determines that an abnormality attributable to excessive call transmission has occurred at step S290 if the number of calls exceeds a reference value at step S210, and determines that an abnormality attributable to excessive SMS transmission has occurred at S290 if the number of SMS transmissions exceeds a reference value at step S220.

Furthermore, the mobile terminal 100 checks whether applications installed or being run in the mobile terminal 100 are applications installed by the user based on the collected basic information and a control command input by the user. If an application installed or being run in the mobile terminal 100 is not an application installed by the user at steps S230 and S240, it is suspected that an abnormality has occurred in the corresponding application at step S290.

Meanwhile, the mobile terminal 100 suspects that an abnormality has occurred in a corresponding application at step S290 if the source (e.g., app market, developer or the like) of the application installed or being run in the mobile terminal 100 is an unreliable source because the source has a history of distributing a malicious application at step S250.

Additionally, the mobile terminal 100 may suspect that an abnormality has occurred in a corresponding application at step S290 if the number of accessed URLs exceeds a reference value at step S260, and may suspect that an abnormality has occurred in a corresponding application at S290 if an accessed URL is malicious at step S270.

It will be apparent that any one of steps S210 to S270 may be omitted and the step of detecting the abnormality of basic information may be added.

Although not shown in FIG. 5, results may be output via the interface unit 120 if it is suspected that an abnormality has occurred, and therefore the user can check on the abnormality.

Meanwhile, if an abnormality is not detected at steps S210 to S270, the mobile terminal determines that the diagnosis of the security of the corresponding mobile terminal 100 is completed at step S280, the corresponding process is terminated.

FIG. 6 illustrates the flow of the process of registering the application for which it is determined that an abnormality has occurred in FIG. 5 in the server 200.

As shown in FIG. 6, the mobile terminal 100 according to the present invention analyzes the results of the system check at the steps of FIG. 5 at step S300. At this time, if the abnormality of an application is detected based on at least one piece of basic information at the steps shown in FIG. 5 at step S310, the application having an abnormality, information about the application and the results of the system check are compressed at step S320.

In this case, the mobile terminal reports the application having an abnormality while sending the compressed data to the server 200 at step S330.

Meanwhile, the server 200 diagnoses whether the application reported at step S330 is malicious, and adds the application to the blacklist stored in the DB if the corresponding application is diagnosed as a malicious application. Furthermore, the server 200 sends a response signal, including the results of the diagnosis of the application, to the mobile terminal 100.

Accordingly, the mobile terminal 100 receives a response from the server 200 at step S340, and, if it is determined based on the response received at step S340 that the application having an abnormality is malicious at step S350, removes the malicious application at step S360, and terminates the corresponding process. It will be apparent that the mobile terminal 100 additionally performs the step of gaining the user's approval during the step of removing the malicious application.

The mobile terminal 100 terminates the process if an abnormality is not detected at the steps shown in FIG. 5 at step S310 or if it is determined at step S350 that the application having an abnormality is not malicious.

The present invention is advantageous in that even when the mobile terminal does not have malware information, the mobile terminal can detect an abnormality related to unknown malware using the collection of basic information based on a system check early on, thereby detecting the abnormality without causing overhead.

Furthermore, the present invention is advantageous in that it is capable of diagnosing whether an application having an abnormality is malicious in conjunction with the server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal having security diagnosis functionality, comprising:
    a system check unit configured to collect basic information of the mobile terminal by performing a system check on the mobile terminal;
    an interface unit configured to include output means to provide the basic information of the mobile terminal, which is collected as a result of the system check performed by the system check unit, to a user and input means to receive a control command from the user;
    a blacklist check unit configured to check whether at least one application installed in the corresponding mobile terminal is present in a blacklist registered on a server;
    a security diagnosis unit configured to, with regard to the application has not been detected as a malicious application by the blacklist check unit, check whether an abnormality has occurred in the corresponding application based on results of a comparison between the basic information of the mobile terminal collected by the system check unit with preset abnormality detection reference information and the control command from the interface unit, and
    a control unit configured to control operations of the system check unit, the interface unit, the blacklist check unit, and the security diagnosis unit.

2. The mobile terminal of claim 1, wherein the system check unit collects at least one piece of basic information selected among system information of the corresponding mobile terminal, a list of applications installed, a list of applications being run, numbers of SMS transmissions and calls, application downloading history, accessed Uniform Resource Locator (URL) information, a shell execution history, a communication access history and principal file attributes.

3. The mobile terminal of claim 1, wherein the security diagnosis unit suspects that an abnormality has occurred in an application installed or being run on the corresponding mobile terminal if it is determined that the application is not an application installed by the user based on the user's control command.

4. The mobile terminal of claim 1, wherein the security diagnosis unit suspects that an abnormality has occurred in an application installed or being run in the corresponding mobile terminal if it is determined based on the at least one piece of basic information that a program which downloaded the application is a program having a history of downloading a malicious application.

5. The mobile terminal of claim 1, wherein the security diagnosis unit suspects that an abnormality has occurred in an application if the at least one piece of basic information exceeds a reference value.

6. The mobile terminal of claim 1, wherein the security diagnosis unit requests the server to determine whether an application, that is suspected that an abnormality has occurred in the application, is malignant based on results of checking whether an abnormality has occurred with the approval of the user, and determines that the corresponding application is malicious based on results of a response from the server.

7. The mobile terminal of claim 6, wherein the security diagnosis unit removes the corresponding application for which it, is suspected that the abnormality has occurred if the application is diagnosed as a malicious application by the server.

8. The mobile terminal of claim 1, wherein the blacklist check unit removes the application present in the blacklist registered on the server among the at least one application installed in the mobile terminal.

9. A method of making a diagnosis of security of a mobile terminal, comprising:

checking whether at least one application installed in the mobile terminal is present in a blacklist registered on a server;

collecting basic information of the mobile terminal by performing a system check on the mobile terminal;

providing the basic information of the mobile terminal, collected as a result of the system check to a user, and receiving a control command from the user;

comparing at least one piece of basic information with preset abnormality detection reference information based on the collected basic information with regard to the application that does not exist on the blacklist; and checking whether an abnormality has occurred in the mobile terminal based on results of the comparison and the control command inputted by the user.

10. The method of claim 9, wherein the collecting comprises collecting at least one piece of basic information selected among system information of the corresponding mobile terminal, a list of applications installed, a list of applications being run, numbers of SMS transmissions and calls, application downloading history, accessed URL information, a shell execution history, a communication access history and principal file attributes.

11. The method of claim 9, wherein the checking comprises suspecting that an abnormality has occurred in an application installed or being run on the corresponding mobile terminal if it is determined that the application is not an application installed by the user based on the user's control command.

12. The method of claim 9, wherein the comparing comprises checking whether a program which downloaded the corresponding application is a program having a history of downloading a malicious application.

13. The method of claim 9, wherein the comparing comprises checking whether the at least one piece of basic information exceeds a reference value.

14. The method of claim 9, further comprising:

requesting the server to determined whether an application, that is suspected that an abnormality has occurred in the application, is malignant based on results of checking whether an abnormality has occurred with the approval of the user; and determining that the corresponding application is malicious based on results of a response from the server.

15. The method of claim 14, further comprising removing the corresponding application for which it is suspected that the abnormality has occurred if the application is diagnosed as a malicious application by the server.

16. The method of claim 9, further comprising removing the application present in the blacklist registered on the server among the at least one application installed in the mobile terminal.

* * * * *